US008448126B2

(12) United States Patent
Laight et al.

(10) Patent No.: US 8,448,126 B2
(45) Date of Patent: May 21, 2013

(54) COMPLIANCE PROGRAM ASSESSMENT TOOL

(75) Inventors: Kimberly Laight, Greensboro, NC (US); Jennifer G. Ackerman, Charlotte, NC (US); Burl Edwin Allen, Jr., Charlotte, NC (US); Anita W. Sabol, Huntersville, NC (US); Dennis J. McInerney, Monroe, NC (US); Janine D. Thomas, Broadbrook, CT (US)

(73) Assignee: Bank of America Corporation, Charlotte, NC (US)

( * ) Notice: Subject to any disclaimer, the term of this patent is extended or adjusted under 35 U.S.C. 154(b) by 1352 days.

(21) Appl. No.: 11/306,784

(22) Filed: Jan. 11, 2006

(65) Prior Publication Data

US 2007/0226721 A1 Sep. 27, 2007

(51) Int. Cl.
*G06F 9/44* (2006.01)

(52) U.S. Cl.
USPC ........................................ 717/101; 705/7.11

(58) Field of Classification Search ................... 705/1, 7, 705/10, 11; 717/101
See application file for complete search history.

(56) References Cited

U.S. PATENT DOCUMENTS

| 6,636,585 | B2 * | 10/2003 | Salzberg et al. | 379/22 |
|---|---|---|---|---|
| 6,912,502 | B1 * | 6/2005 | Buddle et al. | 705/1 |
| 7,305,351 | B1 * | 12/2007 | Bechhofer et al. | 705/7 |
| 7,359,865 | B1 * | 4/2008 | Connor et al. | 705/10 |
| 7,433,829 | B2 * | 10/2008 | Borgia et al. | 705/7 |
| 2002/0059093 | A1 * | 5/2002 | Barton et al. | 705/10 |
| 2002/0143595 | A1 * | 10/2002 | Frank et al. | 705/8 |
| 2003/0004846 | A1 * | 1/2003 | Schneider | 705/36 |
| 2003/0069894 | A1 * | 4/2003 | Cotter et al. | 707/104.1 |
| 2004/0128186 | A1 * | 7/2004 | Breslin et al. | 705/10 |
| 2005/0010469 | A1 * | 1/2005 | Brown et al. | 705/10 |
| 2005/0066021 | A1 * | 3/2005 | Megley | 709/223 |
| 2005/0114829 | A1 * | 5/2005 | Robin et al. | 717/101 |
| 2006/0282276 | A1 * | 12/2006 | Venzon et al. | 705/1 |
| 2007/0143849 | A1 * | 6/2007 | Adar | 726/25 |

OTHER PUBLICATIONS

Santéon, "Gap Analysis", Feb. 2005, retrieved from: http://web.archive.org/web/20050211005315/http://santeon.com/software/ACTISgapanalysis.html.*
National Institute of Standards and Technology, Integrating IT Security into the Capital Planning and Investment Control Process, Jan. 2005, NIST Special Publication 800-65.*

(Continued)

*Primary Examiner* — Chat Do
*Assistant Examiner* — Jue Wang
(74) *Attorney, Agent, or Firm* — Michael A. Springs; Moore and Van Allen PLLC; Patrick B. Horne

(57) ABSTRACT

This invention provides a compliance assessment system and tool for efficiently assessing compliance programs and managing compliance program assessments across an organization. Compliance activities are measured against a group of Compliance Program Element Requirements (CPR's) that are used to assess LOB compliance programs. The CPR's define the minimum standards for the LOB's documentation and execution of its compliance program. Assessment results are documented and a compliance program assessment data sheet is developed. A rating is also provided for the status of the documentation supporting the compliance program and the effectiveness of the execution of the compliance program. From these inputs the tool of the invention automatically calculates a score representative of the adequacy and effectiveness of the compliance program. The tool also assigns a color code based at least in part on the score. Reports may be generated that can be used to determine compliance trends.

20 Claims, 13 Drawing Sheets

OTHER PUBLICATIONS

PCT International Search Report and Written Opinion mailed Jul. 14, 2008 for International application No. PCT/US07/60125.
Extended European Search Report dated Aug. 25, 2010 for European Application No. EP 07 77 7507.

Statement in Accordance With the Notice from the European Patent Office dated Oct. 1, 2007 Concerning Business Methods'—Document No. XP007905525.

* cited by examiner

| | LINE OF BUSINESS | 304 | |
|---|---|---|---|
| | COMPLETED BY: | 305 | |
| | DATE COMPLETED: | 306 | |

| REQ. NO. | PROGRAM ELEMENT | CPR | CRITICALITY RATING | |
|---|---|---|---|---|
| CA1 | COMMITMENT & ACCOUNTABILITY | COMPLIANCE RISKS... | 5 | |
| CA2 | COMMITMENT & ACCOUNTABILITY | ASSOCIATES ARE HELD... | 5 | |
| | COMMITMENT & ACCOUNTABILITY AVG | | | |
| PP3 | POLICIES & PROCEDURES | A PROCESS IS IN PLACE... | 3 | |
| PP4 | POLICIES & PROCEDURES | COMPLIANCE REQUIREMENTS... | 3 | |
| | POLICIES & PROCEDURES AVG | | | |
| CS5 | CONTROLS & SUPERVISION | GOVERNANCE PROCESSES... | 5 | |
| CS6 | CONTROLS & SUPERVISION | ADEQUATE SUPERVISORY... | 5 | |
| | CONTROLS & SUPERVISION AVG | | | |
| RO7 | REGULATORY OVERSIGHT | A PROCESS IS IN PLACE... | 3 | |
| RO8 | REGULATORY OVERSIGHT | MANAGEMENT MEETS... | 3 | |
| | REGULATORY OVERSIGHT AVG | | | |
| M9 | MONITORING | COMPLIANCE MONITORING... | 5 | |
| M10 | MONITORING | LAWS, REGULATIONS... | 5 | |
| | MONITORING AVG | | | |
| TA11 | TRAINING | COMPLIANCE COMPETENCIES... | 3 | |
| TA12 | TRAINING | TRAINING METRICS... | 3 | |
| | TRAINING AVG | | | |
| R13 | REPORTING | A PROCESS EXISTS TO... | 3 | |
| R14 | REPORTING | MANAGEMENT REPORTS... | 3 | |
| | REPORTING AVG | | | |
| | OVERALL ASSESSMENT SCORE | | | |

FIG. 3A

| DOCUMENTATION ADEQUACY | DOC. RATING | EXECUTION EFFECTIVENESS | EXEC. RATING | COMPLIANCE PROGRAM ASSESSMENT SCORE |
|---|---|---|---|---|
| | 2 | | 1 | 10 |
| | 4 | | 5 | 100 |
| | 3 | | 3 | 55 |
| | 1 | | 4 | 12 |
| | 5 | | 4 | 60 |
| | 3 | | 4 | 36 |
| | 3 | | 3 | 45 |
| | 4 | | 5 | 100 |
| | 4 | | 4 | 72.5 |
| | 2 | | 4 | 24 |
| | 4 | | 5 | 60 |
| | 3 | | 5 | 42 |
| | 5 | | 5 | 125 |
| | 5 | | 5 | 125 |
| | 5 | | 5 | 125 |
| | 3 | | 1 | 9 |
| | 5 | | 1 | 15 |
| | 4 | | 1 | 12 |
| | 2 | | 1 | 6 |
| | 5 | | 2 | 30 |
| | 4 | | 2 | 18 |
| | 4 | | 3.0 | 52 |

FIG. 3B

| SCORE BY COLOR (313) | ACTION PLAN PRIORITY (314) | DOC/EXEC GAPS (315) | # GAPS (316) | REMEDIAL ACTION (317) | ASSC. ACCT. (318) | COMP DATE (319) |
|---|---|---|---|---|---|---|
| G | L |  | 1 |  |  |  |
| R | H |  | 6 |  |  |  |
| R 323 | H | 325 | TOTAL 7 — 327 |  |  |  |
| Y | M |  | 2 |  |  |  |
| R | H |  | 6 |  |  |  |
| Y 323 | M | 325 | TOTAL 8 — 327 |  |  |  |
| Y | M |  | 1 |  |  |  |
| R | H |  | 3 |  |  |  |
| R 323 | H | 325 | TOTAL 4 — 327 |  |  |  |
| Y | M |  | 3 |  |  |  |
| R | H |  | 5 |  |  |  |
| Y 323 | M | 325 | TOTAL 8 — 327 |  |  |  |
| R | H |  | 7 |  |  |  |
| R | H |  | 4 |  |  |  |
| R 323 | H | 325 | TOTAL 11 — 327 |  |  |  |
| Y | L |  | 0 |  |  |  |
| Y | L |  | 0 |  |  |  |
| G 323 | L | 325 | TOTAL 0 — 327 |  |  |  |
| G | L |  | 2 |  |  |  |
| Y | M |  | 7 |  |  |  |
| G 323 | L | 325 | TOTAL 9 — 327 |  |  |  |
| R | H |  | TOTAL 47 |  |  |  |

LINE OF BUSINESS OR SUPPORT GROUP:
COMPLETED BY:
DATE COMPLETED:

| LOB COMPLIANCE PROGRAM ASSESSMENT SUMMARY | | | | | |
|---|---|---|---|---|---|
| | AVERAGE DOCUMENTATION RATING | AVERAGE EXECUTION RATING | CPAS | SCORE BY COLOR | # OF GAPS |
| COMMITMENT AND ACCOUNTABILITY | 3 | 2 | 33 | Y | 11 |
| POLICIES AND PROCEDURES | 3 | 3 | 25 | Y | 4 |
| CONTROLS & SUPERVISION | 2 | 3 | 33 | Y | 8 |
| REGULATORY OVERSIGHT | 4 | 3 | 37 | Y | 8 |
| MONITORING | 3 | 3 | 40 | Y | 7 |
| TRAINING AND AWARENESS | 2 | 3 | 18 | Y | 7 |
| REPORTING | 2 | 2 | 11 | G | 5 |
| OVERALL ASSESSMENT SCORE | 3 | 3 | 28 | Y | 50 |

302 brackets rows from COMMITMENT AND ACCOUNTABILITY through OVERALL ASSESSMENT SCORE.

FIG. 7

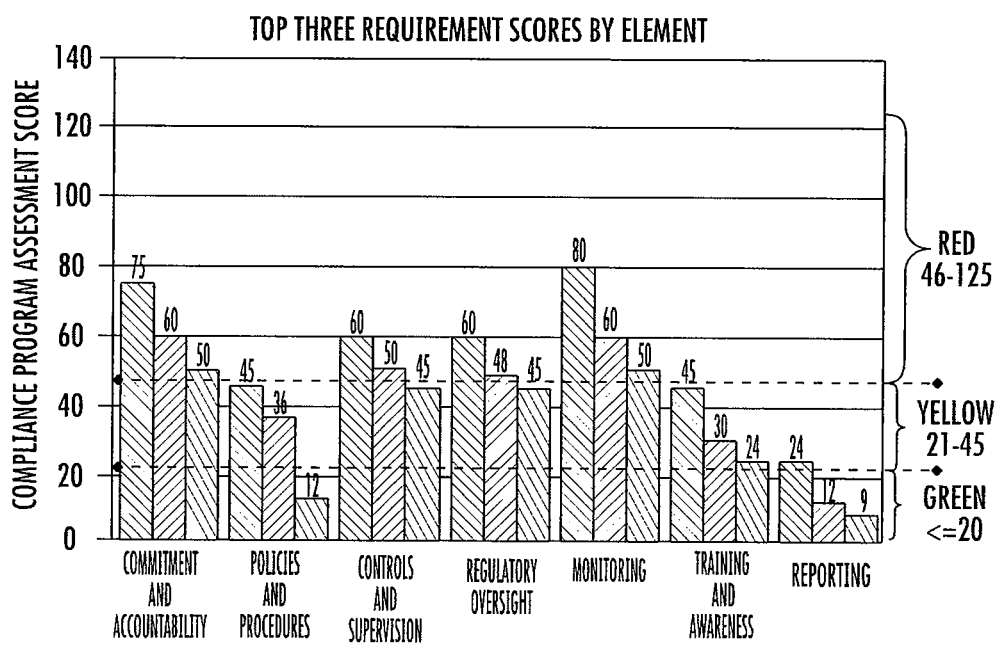

FIG. 8

COMPLIANCE PROGRAM ASSESSMENT TOOL

BACKGROUND OF THE INVENTION

Many institutions must comply with various rules, policies, regulations, and guidelines, whether established internally, by a regulatory entity, or as a result of legislation (hereinafter "rules"). Because some of these rules may place responsibility on the institution for overseeing consistent compliance or adherence to the rules, there is an increasing need for a comprehensive process to manage compliance programs across an entire business organization. Moreover, different lines of business (LOB's) within an organization may have different compliance policies and procedures. For very large and geographically diverse organizations, these requirements can create a significant challenge and resource expenditure.

In order to ensure that an organization's LOB's compliance programs are adequate and effective it is necessary for the organization to perform compliance program assessments. These assessments evaluate the documentation adequacy and execution effectiveness of the compliance program across the organization. Additionally, compliance assessments can at times uncover areas where improvements or remedial actions may be implemented. These efforts must have currency and must be adequately monitored and tracked over time. Therefore, there is a need for an integrated process and tool for efficiently assessing compliance programs and managing compliance program assessments across an organization.

SUMMARY OF THE INVENTION

This invention provides a compliance assessment system and tool for monitoring the compliance activities across an organization. Compliance activities are measured against a group of Compliance Program Requirements (CPR's) that are used to assess LOB compliance programs. The CPR's may be organized such that the CPR's are categorized under a number of higher level compliance program elements. The CPR's define the minimum standards for the LOB's documentation and execution of its compliance program. Assessment results are documented and a compliance program assessment data sheet, graphic representations and high level reports are generated that can be used to determine compliance trends. CPR's may be identified and the criticality of each CPR determined across the entire organization. For each CPR a rating is also provided for the status of the documentation supporting the compliance program and the effectiveness of the execution of the compliance program. From these inputs the tool of the invention automatically calculates a score representative of the adequacy and effectiveness of the compliance program. The tool also assigns a color code based at least in part on the score to provide a quick visual indication of the status of the compliance program. Once the score is established for a CPR, a value (low, medium, high) is assigned to each CPR. This value is used to prioritize the gaps associated with each CPR for remedial attention.

In some embodiments the compliance assessment system of the invention includes various modules, applications, or application modules that work together to accomplish compliance program assessments, prioritization, recommended action and reporting. These can be implemented by a computer system or systems and networks. A compliance program assessment module facilitates the development of compliance assessments by organizing the CPR's based on the requirements of the organization; by capturing assessment data; by calculating assessment scores based on the requirements and data; and by prioritizing the recommended actions for any gaps identified. A common database is operatively connected to the compliance program assessment module and other modules to maintain the CPRs, the scores and other data related to the assessments. A reporting function can be provided to facilitate monitoring of the compliance programs of an organization.

In some embodiments, the invention is implemented via a computing platform or a collection of computing platforms interconnected by a network, such as a corporate intranet, in which case a web browser can facilitate use of the invention. A computer program product or products containing computer programs with various instructions cause the hardware to carry out, at least in part, the methods of the invention. Applications, or modules, such as the previously mentioned compliance program assessment module may be operated on a server or workstation. If the applications are running on a server, the modules are accessed from a client workstation. A database is operatively connected to the modules. The database can reside on the same platform as one or more of the application modules, but more typically will reside on a database server. In this computer-based embodiment, the hardware and software together form the means for carrying out the invention.

BRIEF DESCRIPTION OF THE DRAWINGS

FIG. 3 is an example data sheet that might be created by compliance program assessment module of the invention.

FIGS. 7 through 12 illustrate the reporting function of the tool of the invention.

DETAILED DESCRIPTION OF EXAMPLE EMBODIMENTS

The present invention can most readily be understood by considering the detailed embodiments presented herein. Some of these embodiments are presented in the context of a large enterprise using a corporate intranet to facilitate the carrying out of the compliance program assessment function; however, these embodiments are examples only. The invention has applicability to any type of compliance program assessment activity in any type of organization.

The terms "enterprise" or "organization" typically are being used to refer to an entity such as a company or association that is making use of the invention. The entity can be large or small. A "line of business (LOB)" generally refers to a division within an enterprise or organization. A "compliance role" is used in this application to represent a function defined by the institution that is required to complete one or more compliance program assessment tasks such as a compliance officer, auditor or other function. Typically a role will be filled by an individual or team of individuals such as compliance officers authorized and trained to perform the function required by the specific task.

The terms, "module", "application module", and in some cases, simply "application" are meant to refer to a specific process that is performed as part of the task management system discussed throughout. Often a module corresponds to a software application. Some modules are for processes in which a compliance role collects and inputs data to the compliance program assessment module. The term "work station" as used in this application is intended to encompass any device from which a compliance role accesses the system of the invention.

Figure 1:
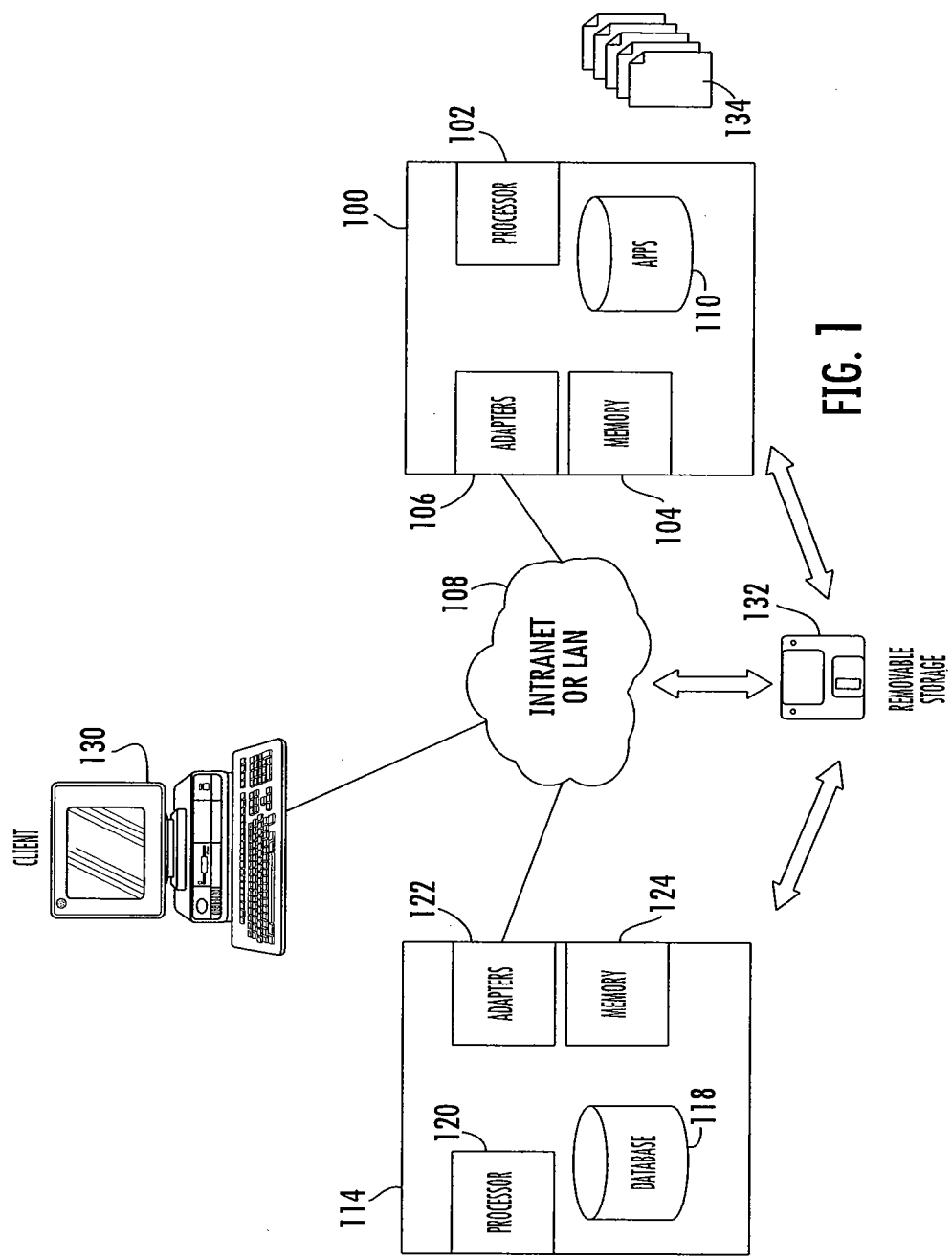
FIG. 1 is a block diagram of some of the computing hardware that is used to implement some embodiments of the invention
Figure 2:
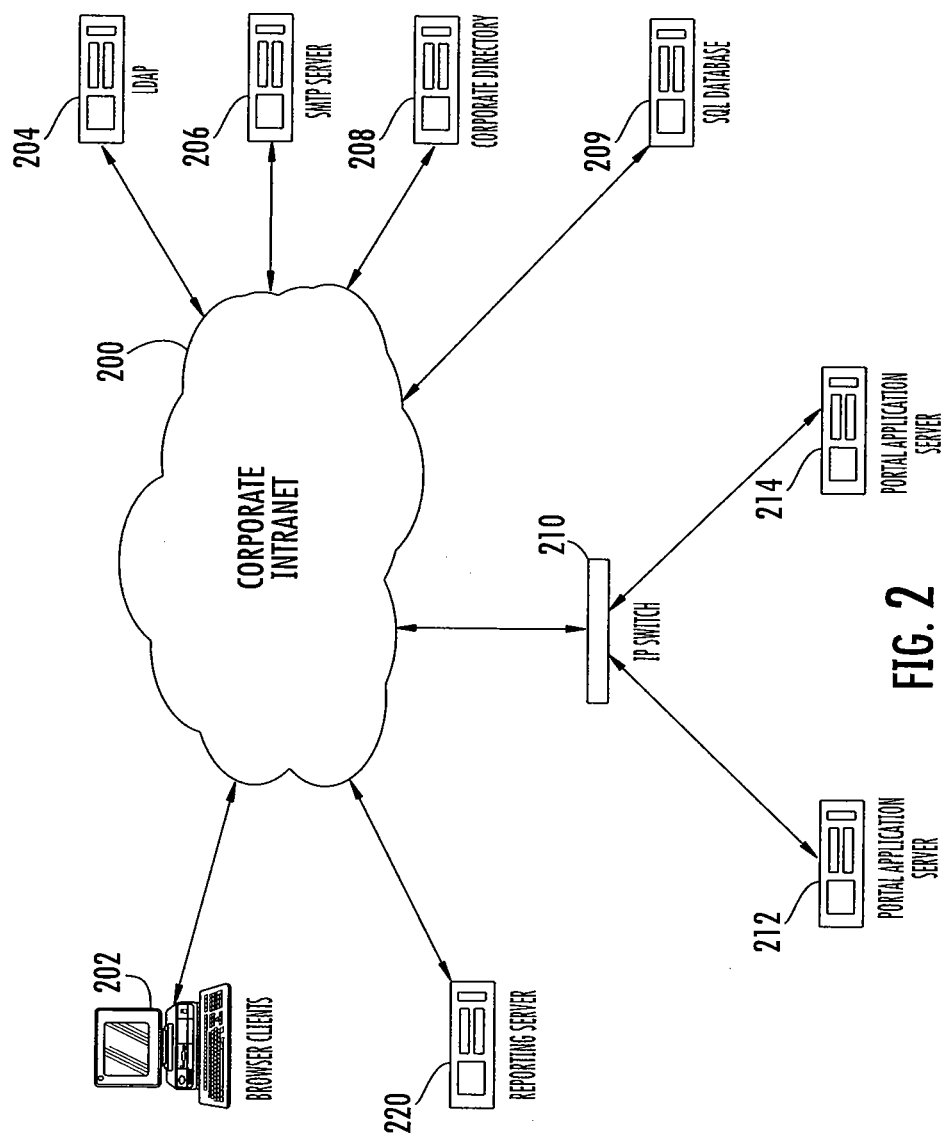
FIG. 2 is a network block diagram of the hardware used to implement the invention in an example embodiment suitable for use in a large enterprise.

FIG. 1 illustrates, in block diagram form, a view of a computer-implemented embodiment of the invention as it might be implemented on a network. A view of the components of a networked, on-line system is shown in FIG. 2, discussed below. FIG. 1 includes a computing platform, 100. The platform is controlled by a processor, 102, which serves as the central processing unit (CPU) for the platform. Memory 104 is typically divided into multiple types of memory or memory areas such as read-only memory (ROM), and random access memory (RAM). A plurality of general-purpose adapters, 106, are present. At least one, in this example, serves to connect the computing platform to a network 108. The network might be a corporate intranet, or simply a local area network (LAN). Computer program code instructions for implementing the appropriate application modules are stored on the fixed disk, 110 including compliance program assessment module 134. When the system is operating, the instructions are partially loaded into memory and executed by the CPU. Numerous types of general purpose computer systems and workstations are available and can be used to implement computing platform 100. Available systems include those that run operating systems such as Windows™ by Microsoft, various versions of UNIX™, various versions of Linux™, and various versions of Apple's Mac™ OS.

It must be noted that the entire function of the invention, including the common database can be implemented in whole or in part on a single computing platform like that shown in FIG. 1. This might be the case, for example, if a small business were to make use of the invention on a stand-alone personal computer. In other embodiments, however, the common database would be stored on a database server such as an SQL server, as shown at 114 of FIG. 1. In this case, fixed disk storage, 118, contains the database. Processor 120, adapters 122, and memory 124 function similarly to those of computing platform 100. If a corporate intranet is used for connectivity, the applications or modules on computing platform 100 can be accessed from a client workstation 130, via a web page. With appropriate security protocols, the assessments and action tracking can also be accomplished remotely over the Internet as will hereinafter be explained with reference to FIG. 2.

In any case, a computer program which implements parts of the invention through the use of a system like that illustrated in FIG. 1 can take the form of a computer program product such as MICROSOFT EXCEL spreadsheet residing on a computer usable or computer readable storage medium. Such a medium, a diskette, is shown at 132 in FIG. 1. A computer program product containing the program of instructions can be supplied in such a form, and loaded on the machines involved, either directly, or over a network. The computer programs can reside on any medium that can contain, store, or communicate the program for use by or in connection with an instruction execution system, apparatus, or device. The computer-usable or computer-readable medium may be, for example but not limited to, an electronic, magnetic, optical, electromagnetic, or semiconductor system, apparatus, or device. Other examples of the computer-readable medium would include an electrical connection having one or more wires, a portable computer diskette or portable fixed disk, an optical fiber, a compact disc read-only memory (CD-ROM), and a digital versatile disc read-only memory (DVD-ROM).

Figure 4:
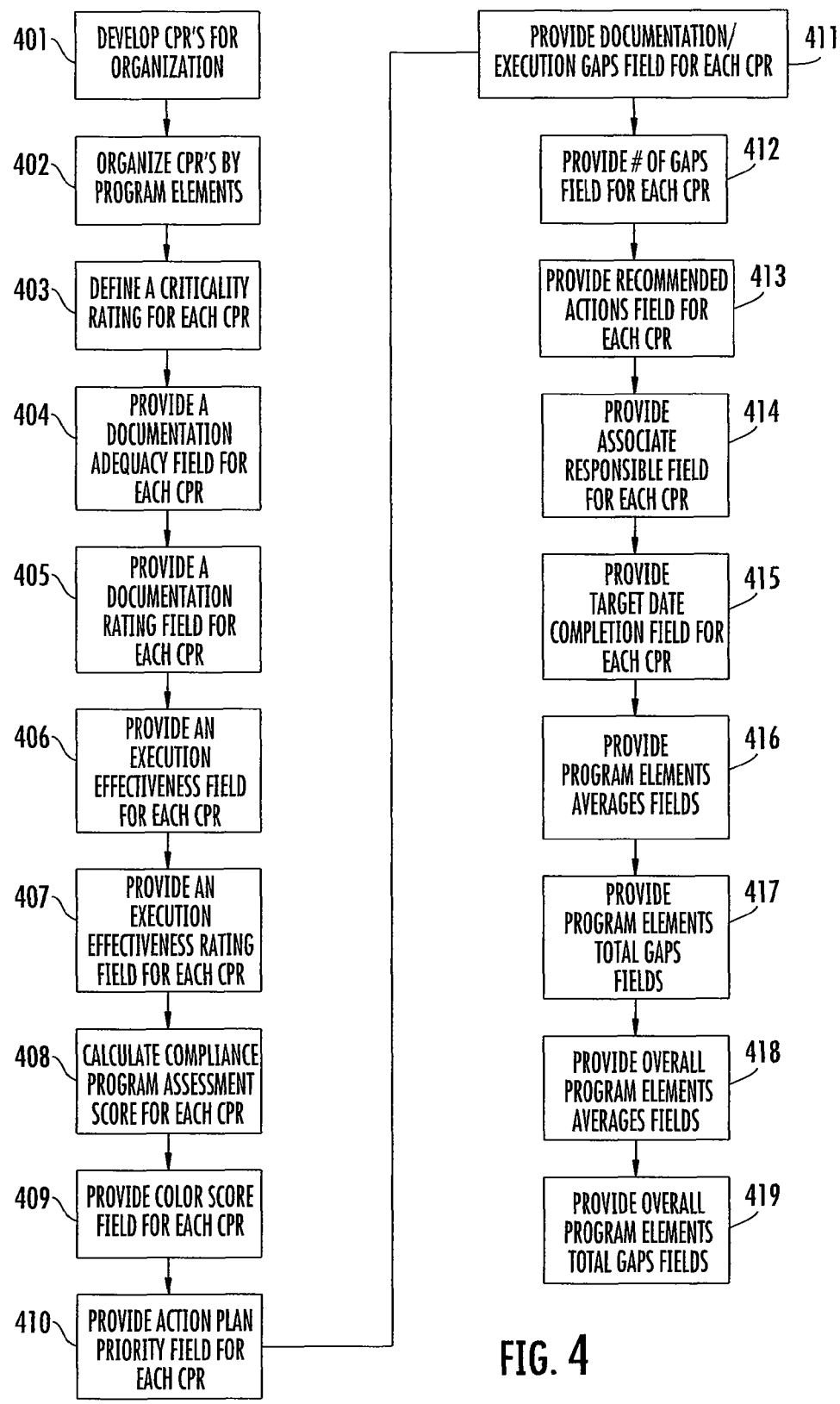
FIG. 4 is a flowchart illustrating the initiation and set up of the compliance program assessment system according to one embodiment of the invention.

Initiation and set up of the system of the invention will now be described with reference to the embodiment of the data sheet of the invention shown in FIG. 3 and the flow diagram of FIG. 4. Senior management of the organization or other authorized parties develop the CPR's 301 that apply to the organization and for which the organization is ultimately responsible for complying with based on the rules that govern that organization (block 401). A CPR is a defined process, procedure or activity that a LOB must carry out to fulfill the LOB's compliance requirements. Each CPR typically consists of a description of the requirement, process and/or procedure needed to be undertaken by the organization as determined by application of the compliance rules. The CPR descriptor may include a description of the activity to which the CPR relates and/or other relevant information. Each CPR may be provided a Requirement Number 303 to facilitate reference to the CPR. The Requirement Number may consist of an alpha-numeric code such as a two letter abbreviation of the program element to which it relates and an identification number. A CPR may encompass a number of activities or processes that must be performed by the LOB in order to meet the defined CPR. These CPR's can be stored on the system in memory 104 or 124 or may be accessed from an archive separate from the system. In a preferred embodiment the CPR's are accessible by the compliance roles when the roles are performing the compliance assessment such as at work station 130.

In one embodiment the CPR's are organized such that the CPR's are categorized under a number of higher level compliance program elements 302 (block 402). The CPR's categorized under each of the program elements are related to that program element such that if all of the CPR's related to a program element are satisfied that program element will be satisfied.

In the present implementation seven such program elements 302 are defined, it is to be understood that a greater or lesser number of program elements may be defined. In the present implementation 50 CPR's 301 are defined each of which falls under one of the program elements 302. In the present implementation the program elements 302 and CPR's 301 are defined at the organization level such that these elements will be the same for every LOB in the organization. Each CPR 301 contains a description of the requirement that the LOB must fulfill in order to satisfy that CPR. The description will be used by the compliance role in determining if a LOB has met the requirement for that CPR. The system may include additional background information for each CPR that may be referred to by the compliance role when assessing the CPR. The background information may include the source of the CPR such as a United States Code chapter or internal policy number or other explanatory information. A link may be provided in the CPR to access this background information. For each CPR a criticality rating 307 is defined where the criticality rating represents the relative criticality of each CPR as compared to the other CPR's (block 403). In the illustrated embodiment two criticality ratings 3 and 5 are used where a rating of 5 indicates a CPR that is relatively more critical to an effective compliance program. It is to be understood that a greater degree of granularity may be provided by using more than two ratings. Like the program elements 302 and CPR's 301, the criticality ratings 307 are defined at the organization level such that the criticality ratings will be the same for every LOB in the organization.

In one implementation, the program elements 302 and CPR's 301 are listed below where the CPR's are based on the compliance program assessment requirements for an organization having internal and external compliance requirements including governmental and regulatory rules:

Program Element No. 1—Commitment and Accountability

1. A compliance program is maintained and implemented in accordance with the LOB compliance program guidelines.

2. Key compliance risks are considered early in new product and process development to ensure risks are appropriately managed.

3. Compliance issues and risks are incorporated into the organization's risk review and LOB self-assessment processes.

4. Resources are adequate and qualified to provide the necessary expertise, and able to fund projects/initiatives to manage current and emerging compliance risk.

5. Compliance risks/topics are included as agenda items during executive and senior management meetings.

6. Compliance risks and metrics are considered in Hoshin planning.

7. Associates are held accountable for compliance performance including violations of company standards.

8. Compliance roles, accountabilities, and performance expectations are documented and communicated.

9. Senior management communicates compliance commitment to their associates on a regular basis.

10. A process in place to identify and address compliance gaps, current and emerging compliance risks, and compliance program deficiencies on a timely basis.

11. A process is in place to update the compliance program as needed.

Program Element No. 2—Policies and Procedures

12. An inventory of policies, procedures and guidelines is maintained, implemented and easily accessible, and appropriate retention history processes are in place.

13. Compliance requirements are embedded into policies, procedures, and processes to direct associates in executing their daily responsibilities to manage compliance risk.

14. A process is in place for updating and approving policies and procedures, including involvement of compliance to ensure regulatory requirements are met.

15. A process is in place to communicate new or updated policies and procedures.

Program Element No. 3—Controls and Supervision

16. A process exists to ensure that appropriate controls are in place to mitigate compliance risks.

17. A process is in place to ensure that controls to mitigate compliance risks are developed and enhanced as necessary.

18. Governance processes are in place and incorporate compliance risk.

19. Adequate supervisory processes are established to oversee high-risk activities.

20. Clear lines of authority and escalation paths are established and communicated to associates.

21. Supervisory and management processes are adequate to appropriately oversee associate actions.

22. Appropriate controls are in place to mitigate compliance risks identified through external environment activities and events.

23. Compliance issues, risks, and violations are aggregated, updated, and tracked to ensure timely resolution and are escalated as appropriate.

Program Element No. 4—Regulatory Oversight

24. An inventory of applicable federal, state, and country laws, regulations, and guidelines is maintained and up-to-date, including risk ratings.

25. Processes are in place to forecast emerging compliance issues and risks.

26. A process is in place to identify regulatory updates and provide feedback on proposed regulatory changes and final rules.

27. All stakeholders participate in analyzing business impacts resulting from changes to laws and regulations.

28. A process is in place for communicating regulatory changes.

29. Management meets with the regulators on a regular basis and appropriately reacts to the level of regulatory scrutiny.

30. Management provides accurate and timely information requested as part of a regulatory examination or investigation, and effectively manages examinations or investigations.

31. Management provides timely and consistent responses to regulatory findings and takes appropriate corrective action.

Program Element No. 5—Monitoring

32. Compliance monitoring program standards have been developed and are utilized to customize business compliance monitoring programs.

33. Laws, regulations, and compliance risks are mapped to appropriate policies, procedures, controls, and monitoring activities.

34. Processes exist to identify and periodically evaluate activities to be monitored.

35. Processes are in place to identify compliance issues and risks and to ascertain the effectiveness of adhering to applicable laws, regulations, policies, and procedures.

36. A process exists to maintain a current monitoring plan for activities to be monitored, including frequencies and accountabilities.

37. Adequate and timely reports regarding monitoring results are provided to appropriate management.

38. Compliance violations and customer complaints are investigated, analyzed and reported to management.

Program Element No. 6—Training and Awareness

39. Compliance is included in LOB annual associate learning goals and curriculum development.

40. Compliance competencies are integrated into LOB processes.

41. An effective communication process exists for enhancing awareness of compliance information.

42. Training metrics are required, tracked, and owned by LOB management.

43. An effective process is in place for identifying compliance training and communication needs, including consideration of needs identified through monitoring, regulatory change, audit and examiner findings, etc.

44. Associates have an adequate awareness of laws and regulations and apply it in the course of performing their job function and responsibilities.

45. Adequate training exists on the application of compliance policies and procedures.

Program Element No. 7—Reporting

46. Management reports summarize monitoring results, key risks, emerging risks, compliance violations, resolution activities, and significant business initiatives.

47. Compliance issues and risks are reported to the appropriate level of management in a timely manner.

48. A process exists to ensure that regulatory reports contain accurate and complete information, and are filed in a timely manner.

49. Appropriate compliance metrics measure compliance performance and are reported to management.

50. Processes exist to analyze compliance risk results and the external environment in order to report level and direction of compliance risk into the integrated planning process.

It is to be understood that other CPR's may also be defined in addition to or in place of those listed above. Moreover, while only 14 CPR's are shown in FIG. 3 for explanatory purposes it will be appreciated that in actual implementation all relevant CPR's will be used.

The data sheet of the invention also includes an LOB field 304 for which the assessment is being conducted. Fields for identifying the compliance role 305 and completion date of the assessment 306 are also provided. The data sheet further includes a Documentation Adequacy field 308 associated with each CPR 301 for storing the findings related to the sufficiency and/or status of the documentation for that CPR (block 404). Attachments may be included that provide associated documents to the role or where a role can paste documents to be sent to the system with the response.

A Documentation Rating field 309 is also provided that stores a numerical rating that represents the status of the documentation for that CPR (block 405). The ratings may either be keyed in or selected from a drop down menu. In the present implementation a 1 to 5 rating scheme is employed where 1 represents the best or strongest rating and defines a CPR 301 that is comprehensively and thoroughly documented. The best or strongest rating indicates a CPR 301 where no "gaps" are observed. A gap is defined as a shortcoming, omission or area for improvement in fulfilling a CPR. A rating of 5 indicates a CPR where fulfillment of the requirement is significantly below standards. A rating of 5 would indicate significant or multiple gaps in fulfilling that CPR. The ratings between 1 and 5 indicate a progressive status between the extremes. While a rating scale of between 1 and 5 has been described a rating scheme of greater or lesser granularity may also be used. The ratings indicate how adequately the LOB has addressed or satisfied the CPR.

An Execution Effectiveness field 310 is provided that stores a description of how effectively the CPR 301 is actually implemented by the LOB (block 406). An Execution Rating field 311 is also provided for each CPR 301 in which a numerical rating is entered that represents the execution effectiveness in a manner similar to that described for the Documentation Rating field 309 (block 407).

Once the documentation rating and execution rating are determined and entered into fields 309 and 311, respectively, the compliance module automatically calculates a compliance program assessment score that is entered into Compliance Program Assessment Score field 312 for that CPR (block 408). This score is automatically calculated by the compliance program assessment module by multiplying the criticality rating 307 by the Documentation rating 309 and the Execution rating 311. Such automatic calculations are known and can be effected by a commercially available program such as MICROSOFT EXCEL or by a proprietary program.

A Color Score field 313 is also provided in which a color score is automatically entered by the compliance program assessment module 134 where each CPR 301 may have a unique color score (block 409). The color score provides a quick reference as to the status of any CPR and is based on the numerical Compliance Program Assessment Score in field 312. In the present implementation one of three color scores may be entered—green, yellow or red. The colors red, yellow and green are represented by the letters R, Y and G in FIG. 3, it is to be understood that in the actual implementation this field would actually be colored with the appropriate color. While the use of colors has been described it is to be understood that the color score may also be designated by words, symbols or other visually distinguishable indicia.

In one embodiment the color scores are determined as follows:

A numerical Compliance Program Assessment Score of less than or equal to 20 is given a green color score;

A numerical Compliance Program Assessment Score of between 21 and 45, inclusive, is given a yellow color score; and A numerical Compliance Program Assessment Score of greater than or equal to 46 is given a red color score.

While example numerical scores and color schemes are described, it will be appreciated that other score ranges may define the color score and that other colors may be used.

The color scores as determined by the numerical calculations described above are modulated by an additional logic assessment. Specifically, a CPR 301 with a score of less than or equal to 20 will not be coded green unless the Program Documentation score is less than 4 or the Execution Effectiveness score is less than 3 as shown by Requirement No. PP3 in FIG. 3. This ensures that a desired minimum compliance for each of the CPR's is obtained even where the average score would otherwise provide the highest (green) rating. Thus a CPR 301 that has an average score of 20 or less but that has an individual score that does not meet the defined minimum scores will be coded yellow.

An Action Plan Prioritization field 314 is also provided (block 410). Once the color code is determined the program automatically recommends an Action Plan Prioritization for the gaps in that CPR based on the color/score of that CPR. In one embodiment the gaps in a CPR are provided a priority for recommended action of High Priority, Medium Priority or Low Priority. While three priority levels are described it is to be understood that a greater or lesser number of priorities may be designated. In addition to recommending a priority level for a recommended action plan the Action Plan Prioritization may also be used as a mechanism to define time limits for completing remedial action. For example, High Priority may be defined as requiring remedial action within 3 months, Medium Priority may be defined as requiring remedial action within 6 months and Low Priority may be defined as requiring remedial action within 12 months.

A Documentation/Execution Gap field 315 is provided for storing a description of the gaps found during the program assessment for each of the CPR's (block 411). A Number of Gaps field 316 is also provided for storing the number of gaps found for each CPR (block 412). The number of gaps should equal the number of gaps described in the Documentation/Execution Gap field 315. A Recommended Actions field 317 is also provided that stores the recommended actions that need to be taken with respect to each of the CPR gaps (block 413). For CPR's with yellow or red ratings these recommendations may constitute recommended remedial actions required to bring the LOB's compliance with that CPR up to standard.

An Associate Accountable field 318 is provided for storing an identification of the associate responsible for taking the recommended action (block 414). A Target Date for Completion field 319 is provided for storing the date by which the recommended action plan is to be completed (block 415). Both of these fields may be completed based on input from the LOB, the compliance role and/or other resources.

Program Element Average fields 320, 321, 322, 323 and 325 are provided for each Program Element (block 416). Once a rating has been determined for each CPR under a compliance element, the compliance program assessment module 134 of the invention calculates "average" ratings for each of the Program Elements 302. The averages stored in fields 320, 321 and 322 provide average scores for each Program Element's Documentation Rating 309, Execution Rating 311, and Compliance Program Assessment Score 312. Note that in the illustrated embodiment average scores are rounded to the nearest whole number. Alternatively, the average scores may not be rounded. The compliance program assessment module 134 also determines a Program Element Score by Color 323 and Action Plan Prioritization 325 based on the average Program Element scores and logic rules, previously described, as applied to that Program Element. A Total Gaps field 327 is provided for each Program Element that stores the sum of all the gaps identified for all of the CPR's for that Program Element (block 417). These fields are provided for each of the Program Elements.

Once all of the averages are calculated for each of the Program Elements, an Overall Assessment Score is determined by the Compliance Module. Specifically, the Program Assessment module automatically calculates and enters the average overall Program Documentation Rating in field 328, an average overall Program Execution rating in field 330, an average overall Compliance Program Assessment Score in field 332. The system then enters the overall Score by Color in field 334 and the overall Action Plan Priority in field 336 (block 418). The score by color uses the numerical averages for each of the Program Elements to determine a program average and applies logic rules to modulate the numerical average based on the priorities of the organization. For example the overall program assessment will be rated Green only if the average score qualifies as a Green and the Commitment & Accountability, Controls & Supervision, and Monitoring Program Elements are each individually rated Green and none of the Program Elements are rated Red. If the average score qualifies as yellow or if any one of Commitment & Accountability, Controls & Supervision, and Monitoring Program Elements are rated yellow, the overall program Assessment Score will be yellow. Likewise, if the average score qualifies as red or if any one of Commitment & Accountability, Controls & Supervision, and Monitoring Program Elements are rated red, or if any two Program Elements are rated red, the overall program Assessment Score will be red. Other logic rules may be applied based on the needs of the organization.

In addition to the averages for the program elements described above, the Compliance Module also calculates the total sum of all the gaps identified for all of the CPR's and enters this sum in the Total Program Gaps Field 338 (block 419).

Figure 5:
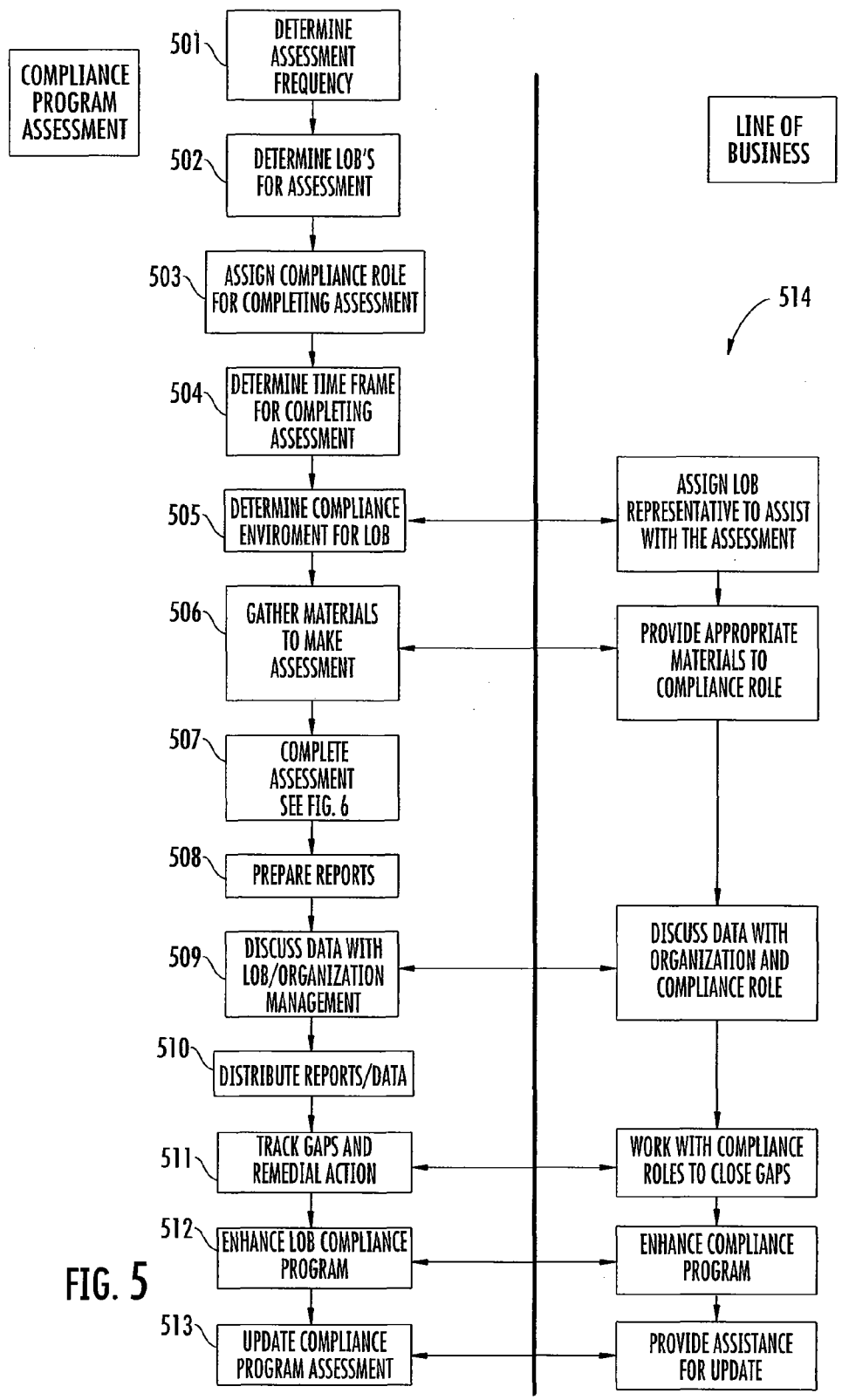
FIG. 5 is a flowchart illustrating the operation of the compliance program assessment system according to one embodiment of the invention.

The tool of the invention may be used to record the status of a LOB's compliance. The tool can also be used to monitor recommended actions for the LOB. The tool may also be used by an organization to manage the overall compliance activity of the organization. Reference is made to FIG. 5 to describe the compliance program assessment process using the tool of the invention. Before implementing the above-described tool the organization and compliance role make preliminary decisions and perform data gathering. The organization determines the frequency with which the compliance assessment will be performed and performs the assessment as per the decided schedule (block 501). For example, the assessments may be performed quarterly, annually or otherwise. The organization then determines the LOB(s) for which an assessment will be performed (block 502). It will be appreciated that not all LOBs in a particular organization may require a compliance assessment and that not all LOB's may require an assessment on the same schedule. The organization assigns a compliance role responsible for completing the assessment (block 503) and determines a date by which the assessment must be completed (block 504). The compliance role contacts internal resources such as legal and audit departments to determine the compliance environment for the LOB being assessed (block 505). During this step the compliance role determines the compliance activity for which the LOB is responsible and the processes which the LOB should be undertaking in order to satisfy its responsibilities. The compliance role also gathers appropriate materials to make the assessment decisions required to implement the tool (block 506). In this regard the compliance role may gather any documentation related to the compliance function and may interview individuals to determine the process employed by the LOB. The materials collected may include the LOB compliance program, business governance documents, compliance reports, risk reviews, LOB communications, performance plans, internal audits, inventories of applicable laws and regulations, LOB self-assessments, management reports, monitoring programs, organization charts and job descriptions, policy and procedure manuals, prior risk or program assessments, recommended action plans, service level agreements, supervisory agency reports and other relevant documents.

Figure 6:
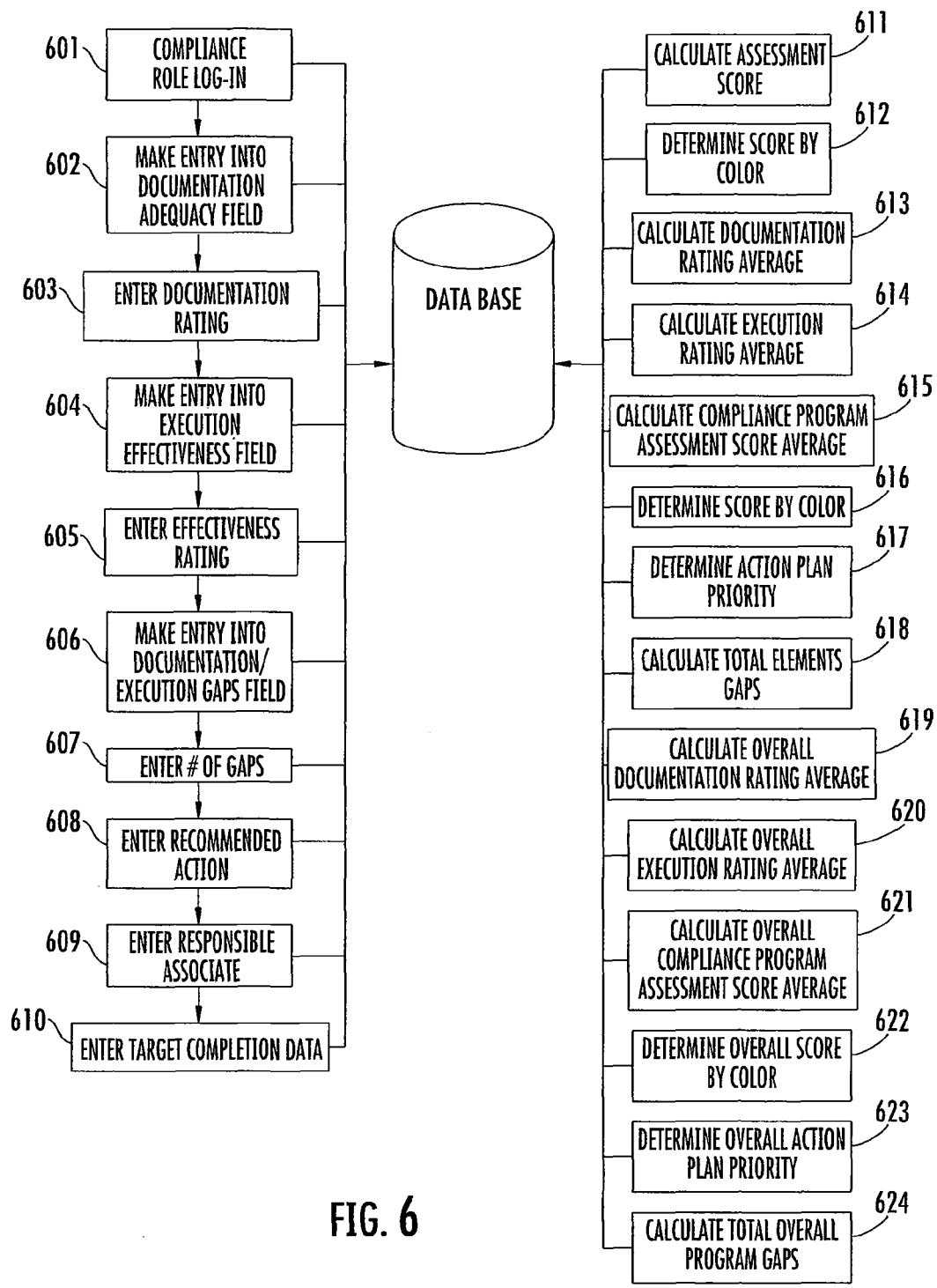
FIG. 6 is a flowchart illustrating the use of the compliance program assessment tool according to one embodiment of the invention.

After the preliminary steps have been completed the compliance role initiates the compliance program assessment module 134 of the invention to complete the assessment (block 507). FIG. 6 illustrates the process associated with the compliance system as implemented by the work station/role using the compliance program assessment module 134. A compliance role logs in at a work station (block 601). The system recognizes that the work station is now active and based on the work station identification and/or the log-in information the system launches the compliance program assessment module 134. Launching of the compliance program assessment module presents the data sheet of FIG. 3 to the compliance role on the work station. The compliance role enters the LOB and compliance role in fields 304 and 305, respectively.

Following the review and validation of the facts and documentation relevant to the compliance program, the compliance role enters sufficient descriptive information into the Documentation Adequacy field 308 (block 602) to support the Documentation Rating entered into field 309 (block 603). The descriptive information may be supported by supplemental information which may be attached to the assessment file or may be maintained as a separate file associated with the assessment file. The compliance role also enters a Documentation Rating into Field 309 that best describes the status of the program documentation (block 603). Likewise, following a review and validation of the program execution the compliance role enters sufficient descriptive information into the Execution Effectiveness field 310 (block 604) to support the Execution Rating. The descriptive information may be supported by supplemental information that may be attached to the assessment file or may be maintained as a separate file associated with the assessment file. The compliance role also enters an Execution Rating into Field 311 that best describes the status of the program Execution effectiveness (block 605).

The compliance role also enters sufficient descriptive information into the Documentation/Execution Gaps field 315 (block 606) to support the number of gaps entered into Field 316 and enters the number of gaps for each CPR being rated in field 316 (block 607). The descriptive information may be supported by supplemental information may be attached to the assessment file or may be maintained as a separate file associated with the assessment file. The number of gaps entered into field 316 should equal the sum of the number of gaps described in Field 315.

The compliance role also enters the description of a recommended action plan in field 317 for addressing the gaps identified in field 315 (block 608). If a separate compliance mechanism is utilized to track recommended action of the identified gaps the action plan does not need to be separately set forth in field 317. In place of the action plan a tracking number of the separate recommended action plan may be entered such that a user of the tool of the invention may be referred to the separate recommended action plan. The descriptive information may be supported by supplemental information which may be attached to the assessment file or may be maintained as a separate file associated with the assessment file.

The recommended action plan may be instituted by the compliance role or it may be decided upon by the joint decision of the LOB, the compliance role and other parties. In addition to setting out the action plan in Field 317, an entity responsible for completing the action plan is entered into Field 318 (block 609) and a target completion date is entered into Field 319 (block 610).

The compliance program assessment module uses the data entered by the compliance role to calculate compliance program assessment values and to populate the compliance program data sheet with these values. The compliance program assessment module 134 calculates the assessment score (block 611) and score by color (block 612) for each CPR and populates fields 312 and 313, respectively, with the results. The compliance module also calculates the Documentation rating average (block 613), Execution rating average (block 614), and Compliance Program Assessment Score average (block 615), and determines the color score (block 616), Action Plan priority (block 617) and Total Element Gaps (block 618) for each Program Element and populates fields 320, 321, 322, 323, 325 and 327 with the results.

Finally, the compliance program assessment module 134 calculates the Overall Assessment Scores including Overall average Documentation rating (block 619), Overall average Execution rating (block 620) and Overall average Compliance Program Assessment Score (block 621) for the entire compliance program and populates fields 328, 330 and 332, respectively, with these calculated scores. The compliance program assessment module also determines the overall score by color (block 622) and overall action plan priority (block 623) and populates fields 334 and 336, respectively. The compliance program assessment module 134 also sums the total number of program gaps and populates field 338 with this score (block 624). The compliance program assessment module can either calculate and/or determine these values after the data sheet is completed or a running set of values can be calculated and/or determined and stored as the data is entered by the compliance role. The common database shown at 118 is continually accessed and updated throughout a compliance program assessment.

Figure 9:
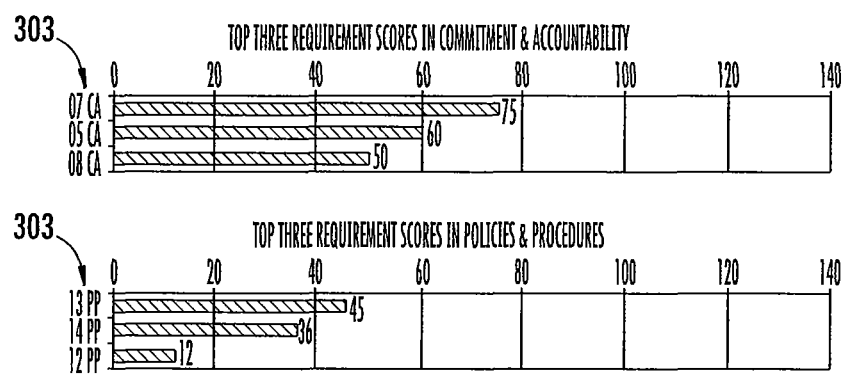
Figure 10:
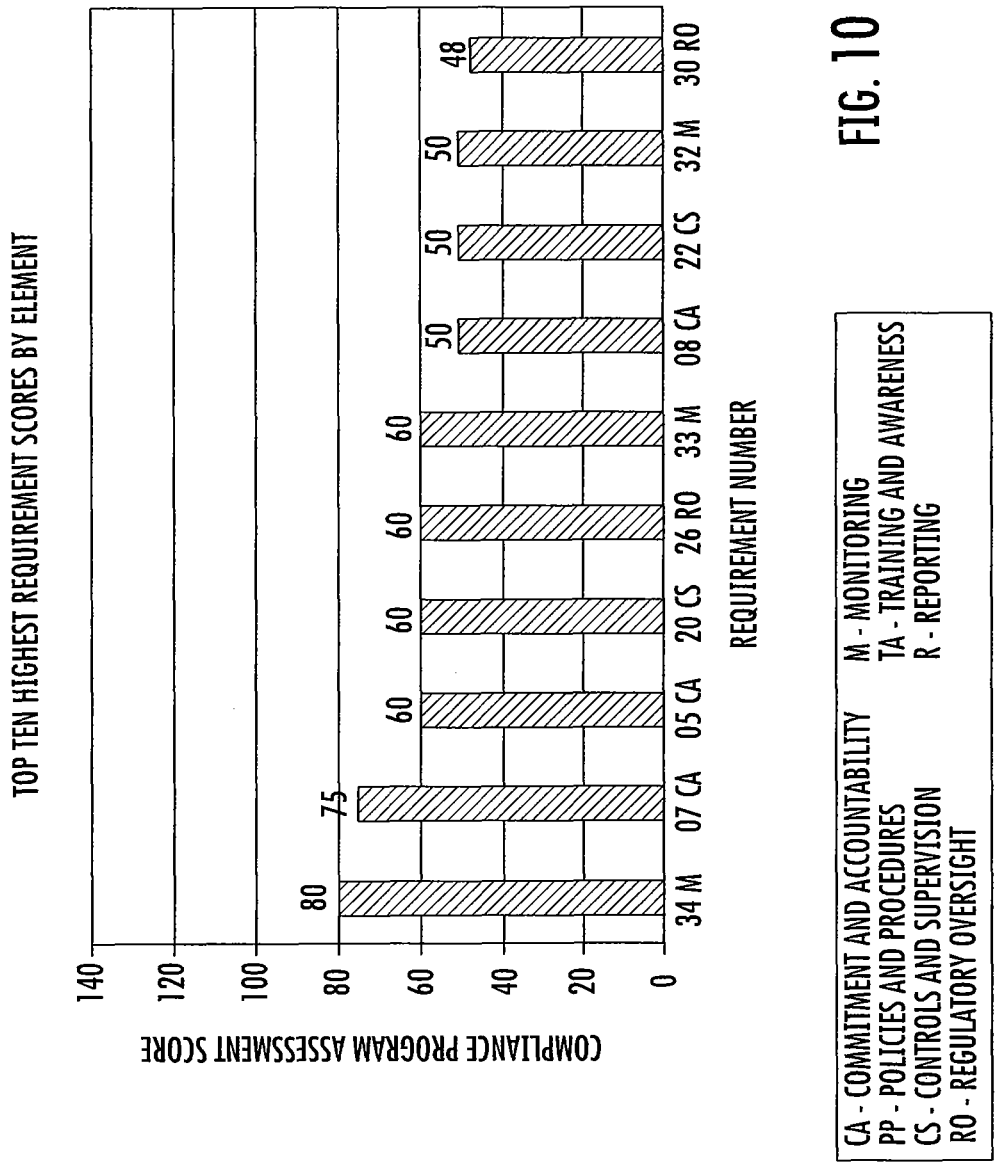
Figure 11:
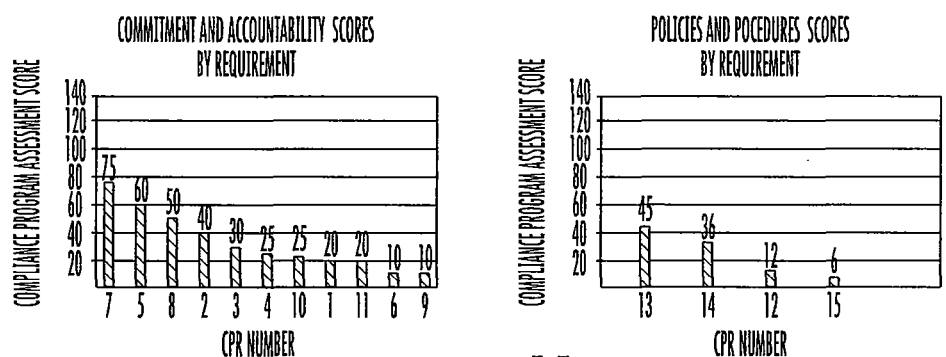
Figure 12:
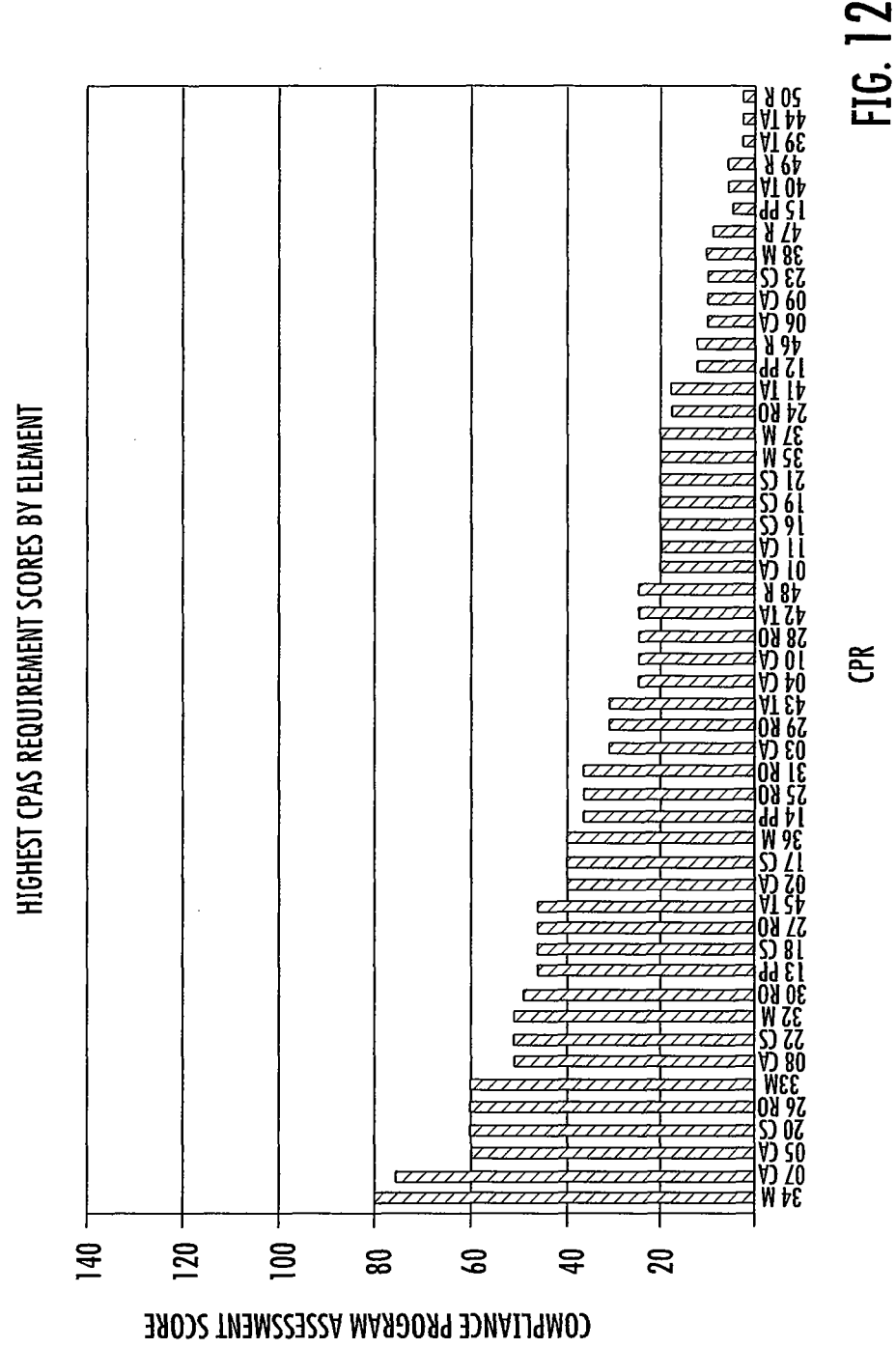

Once the responses are captured in data base 118 the data can be retrieved by the enterprise to review and update the data or to monitor the compliance assessments of the organization. The data stored can also be reported in a variety of formats. This reporting, for example, can be used to show the compliance assessment of an organization or any subset of information to the LOB level (block 508). Standard reports may be automatically developed and presented by a reporting module. Example standard reports are illustrated in FIGS. 7 through 12. FIG. 7 shows a report that illustrates the average scores for each of the program elements 302. FIG. 8 is a bar graph showing the top three (worst) scores for each of the program elements with the score on the left vertical axis, the color score on the right vertical axis. FIG. 9 shows an alternate format of the data of FIG. 8 where the bars are represented by the Requirement Number 303 (i.e. CA=Commitment & Accountability, PP=Policies & Procedures and the like). FIG. 10 shows a bar graph of the 10 highest CPR scores for an LOB identified by Requirement Number 303 and abbreviated reference. FIG. 11 shows a bar graph which includes the Compliance Program Assessment Score for each CPR 301 in each program element 302. FIG. 12 shows a bar graph of the Compliance Program Assessment Score for all CPR's in order of decreasing scores.

Referring again to FIG. 5, the data produced in the data sheet and the reports developed from the data sheet are discussed with appropriate LOB management (block 509). A copy of the Data sheet or any of the reports may be distributed to appropriate levels of the Organization to monitor and manage the compliance activities of the organization (block 510). The gaps identified in the data sheet are tracked and recommended action is taken as set forth in the Recommended actions field 317 (block 511). The LOB compliance program may be enhanced as determined by the compliance program assessment (block 512). The compliance assessment and data sheet may be updated periodically such as quarterly to ensure that the LOB is addressing any gaps identified in the assessment process (block 513). The LOB may have input into various activities of the compliance assessment as represented in block 514.

In at least one embodiment, the system of the invention takes place via the World Wide Web and is computer-based. Further details of the computer system implementation will be discussed with respect to FIG. 2 that illustrates a larger network infrastructure that can be used to implement example embodiments of the invention, for example, in a large corporate enterprise having a world-wide-web (WWW) enabled corporate intranet, 200. Browser clients 202 access the system via a client computing platform. A lightweight directory access protocol (LDAP) server 204 provides authentication when a role logs onto the ICPS. A commercial software product such as SiteMinder (from Netegrity, Inc., can be used for this purpose. Simple mail transfer protocol (SMTP) server 206 is used to generate outgoing notification E-mail messages at key stages of each process. A corporate directory server, 208, provides access to the company's master directory of employees (roles) and other information necessary when identifying or selecting roles for the system of the invention. An internet protocol (IP) switch, 210, provides load-balancing to direct sessions to one of two application servers, 212 and 214. The switch will be run under the so-called "sticky on=yes" configuration, which assures that once a session is assigned to a portal application server computing platform, the session will continue to work in/from that portal until the session is completed.

In this example embodiment, the application servers run using Microsoft's Internet Information Services (IIS). These servers are the launch point for the system modules and will direct action back and forth among the other servers and databases. The common database which has been previously discussed, is implemented on an SQL server shown at 209. The network of FIG. 2 also includes an IIS-based reporting server, 220, which handles report formats and similar tasks involved with operating the reporting module. The reporting server has a stub on the application server that serves as an interface. The reporting server has the ability to schedule reports, such that the data is accessed during off hours during otherwise low utilization of the SQL server. The reporting server accumulates those reports in batch rather than real time.

The login procedure is as follows. A login request is directed through the IP switch to one of the portal application servers. The application server directs the request to the LDAP server for authentication and the LDAP server authenticates and forwards the request to the SQL database for authentication, confirming that the role is known to the compliance program assessment system. Confirmation and information about the role is forwarded back to the application server.

Next, a query is forwarded to the corporate directory, where information about the role is obtained, as well as information about the LOB for which the role is performing the compliance assessment. The type of employee information may include name, telephone number and possibly postal and Email addresses. For the LOB the information may be the LOB name, executive associated with that LOB, and hierarchy information. The information is included in a reply and the application server copies it to the SQL database, where the information is stored. This operation is confirmed, and a welcome screen is generated for the role. From that welcome page, the role will be presented with the data sheet for which the role is responsible. The role opens the data sheet template via a module on the application server. The role enters responses interactively and the database is continually updated as previously described. The template resides on the application server and the data in the SQL database.

Specific embodiments of an invention are described herein. One of ordinary skill in the computing and networking arts will quickly recognize that the invention has other applications in other environments. In fact, many embodiments and implementations are possible. The following claims are in no way intended to limit the scope of the invention to the specific embodiments described above.

What is claimed is:

1. A method implemented on a computerized apparatus configured to assess compliance programs for an organization, the method comprising:
   identifying a plurality of compliance program requirements to be assessed;
   determining a criticality score for each of the plurality of compliance program requirements assessing the criticality of a compliance program requirement relative to the criticality of the other compliance program requirements;
   rating each of the plurality of compliance program requirements with a documentation score assessing the organization's documentation for each of the plurality of compliance program requirements;
   rating each of the plurality of compliance program requirements with an execution score assessing how effectively the organization implements each of the plurality of compliance program requirements;
   calculating a compliance program assessment score for each of the plurality of compliance program requirements based on each compliance program requirement's criticality, documentation, and execution scores, by multiplying the criticality score, the documentation score, and the execution score together;
   assigning a color score to each of the plurality of compliance program requirements based on the compliance program assessment score for each of the plurality of compliance program requirements;
   modulating the color scores for each of the plurality of compliance program requirements by an additional logic assessment whereby the color scores are reduced from a higher rating to a lower rating when the documentation score is less than a predetermined minimum program documentation threshold and whereby the color scores are reduced from the higher rating to the lower rating when the execution score is less than a predetermined minimum execution score threshold;
   calculating a number of gaps found in each of the compliance program requirements, wherein a gap is an omission in fulfilling a compliance program requirement and based at least partially on a difference between the documentation score and an optimal documentation score or a difference between the execution score and an optimal execution score;
   receiving a description of a recommended action that needs to be taken with respect to each of the gaps;
   generating an action plan prioritization for each of the gaps and based on the modulated color scores for each of the plurality of compliance program requirements, wherein generating the action plan prioritization comprises defining time limits for completing the recommended actions for each of the gaps; and
   tracking the progress of each of the recommended actions that needs to be taken with respect to each of the gaps.

2. The method of claim 1 wherein the identifying includes determining requirements related to a compliance program.

3. The method of claim 1 wherein the compliance program requirements are organized by program elements.

4. The method of claim 1 wherein the program elements group related compliance program requirements.

5. The method of claim 4 calculating an average compliance program assessment score for a program element based on the compliance program assessment scores for the compliance program requirements related to that program element.

6. The method of claim 1, wherein rating each of the plurality of compliance program requirements with a documentation score comprises using a communication interface to prompt a user to enter a number related to the relative comprehensiveness of the compliance program requirement's documentation, and wherein rating each of the plurality of compliance program requirements with an execution score comprises using a communication interface to prompt a user to enter a number related to the relative effectiveness of the organization's implementation of the compliance program requirement.

7. A computer program product comprising a non-transitory computer-readable medium having computer-executable program code embodied therein for facilitating compliance program task management in an organization, the computer-executable program code comprising:
   instructions for identifying a plurality of compliance program requirements to be assessed;
   instructions for receiving ratings for each of the plurality of compliance program requirements, the ratings comprising:
      a criticality rating of the criticality of a compliance program requirement in relation to the criticality of the other compliance program requirements;
      a documentation rating of the comprehensiveness of the organization's documentation for the compliance program requirements; and
      an execution rating of the effectiveness of the organization's execution of the compliance program requirements;

instructions for receiving information about a gap found in any of the compliance program requirements, wherein the gap is an omission in fulfilling a compliance program requirement, the information comprising:
  a description of a recommended action that needs to be taken with respect to each of the gaps;
instructions for calculating a compliance program assessment score for each of the plurality of compliance program requirements based on each compliance program requirement's criticality, documentation, and execution ratings, by multiplying the criticality rating, the documentation rating, and the execution rating together;
instructions for assigning a color score to each of the plurality of compliance program requirements based on the compliance program assessment score for each of the plurality of compliance program requirements;
instructions for modulating the color scores for each of the plurality of compliance program requirements by an additional logic assessment whereby the color scores are reduced from a higher rating to a lower rating when the documentation score is less than a predetermined minimum program documentation threshold and whereby the color scores are reduced from the higher rating to the lower rating when the execution score is less than a predetermined minimum execution score threshold;
instructions for calculating a number of gaps found in each of the compliance program requirements based at least partially on a difference between the documentation score and an optimal documentation score or a difference between the execution score and an optimal execution score;
instructions for generating an action plan prioritization for each of the gaps and based on the modulated color scores for each of the plurality of compliance program requirements, wherein generating the action plan prioritization comprises defining time limits for completing the recommended actions for each of the gaps; and
instructions for tracking the progress of each of the recommended actions that needs to be taken with respect to each of the gaps.

8. An apparatus for managing a compliance program, the apparatus comprising:
  means for identifying a plurality of compliance program requirements to be assessed;
  means for receiving a criticality rating for each of the plurality of compliance program requirements, said criticality rating related to the criticality of a compliance program requirement in relation to the criticality of the other compliance program requirements;
  means for receiving a documentation rating for each of the plurality of compliance program requirements, said documentation rating related to the comprehensiveness of a compliance program requirement's documentation in relation to the comprehensiveness of documentation of other compliance program requirements;
  means for receiving an execution rating for each of the plurality of compliance program requirements, said execution rating related to the effectiveness of the organization's execution of a compliance program requirement in relation to the execution of other compliance program requirements;
  means for calculating a compliance program assessment score for each of the plurality of compliance program requirements based on each compliance program requirement's criticality, documentation, and execution ratings, by multiplying the criticality rating, the documentation rating, and the execution rating together;
  means for assigning a color score to each of the plurality of compliance program requirements based on the compliance program assessment score for each of the plurality of compliance program requirements;
  means for modulating the color scores for each of the plurality of compliance program requirements by an additional logic assessment whereby the color scores are reduced from a higher rating to a lower rating when the documentation score is less than a predetermined minimum program documentation threshold and whereby the color scores are reduced from the higher rating to the lower rating when the execution score is less than a predetermined minimum execution score threshold;
  means for calculating a number of gaps found in each of the compliance program requirements, wherein a gap is an omission in fulfilling a compliance program requirement and based at least partially on a difference between the documentation score and an optimal documentation score or a difference between the execution score and an optimal execution score;
  means for receiving a description of a recommended action that needs to be taken with respect to each of the gaps;
  means for generating an action plan prioritization for each of the gaps and based on the modulated color scores for each of the plurality of compliance program requirements, wherein generating the action plan prioritization comprises defining time limits for completing the recommended actions for each of the gaps; and
  means for tracking the progress of each of the recommended actions that needs to be taken with respect to each of the gaps.

9. A compliance program assessment system comprising:
a memory device comprising computer-executable compliance program assessment code stored therein;
a communication interface for communicating with a user or another system; and
a processing device communicatively coupled to the memory device and the communication interface, wherein the processing device is configured to execute the computer-executable compliance program assessment code to:
  provide at least two compliance program requirements, wherein each of the at least two compliance program requirements comprises a process or activity that the organization should carry out to fulfill the organization's compliance requirements;
  use the communication interface to receive a criticality rating related to the criticality of a compliance program requirement relative to the criticality of the other compliance program requirements;
  use the communication interface to receive a documentation rating related to the comprehensiveness of the organization's documentation for the compliance program requirement;
  use the communication interface to receive an execution rating related to how effectively the organization implements the compliance program requirement;
  calculate a compliance program assessment score based on each compliance program requirement's criticality rating, documentation rating, and execution rating, by multiplying the criticality, documentation rating, and the execution rating together;
  assign a color score to each of the plurality of compliance program requirements based on the compliance program assessment score for each of the plurality of compliance program requirements;

modulate the color scores for each of the plurality of compliance program requirements by an additional logic assessment whereby the color scores are reduced from a higher rating to a lower rating when the documentation score is less than a predetermined minimum program documentation threshold and whereby the color scores are reduced from the higher rating to the lower rating when the execution score is less than a predetermined minimum execution score threshold;

use the communication interface to communicate the compliance program assessment score to a user or another system;

calculate a number of gaps found in each of the compliance program requirements, wherein a gap is an omission in fulfilling a compliance program requirement and based at least partially on a difference between the documentation score and an optimal documentation score or a difference between the execution score and an optimal execution score;

use the communication interface to receive a description of a recommended action that needs to be taken with respect to each of the gaps;

generate an action plan prioritization for each of the gaps and based on the modulated color scores for each of the plurality of compliance program requirements, wherein generating the action plan prioritization comprises defining time limits for completing the recommended actions for each of the gaps; and track the progress of each of the recommended actions that needs to be taken with respect to each of the gaps.

10. The system of claim 9, wherein the processor is configured to execute the computer-executable compliance program assessment code to calculate the compliance program assessment score, based at least partially on the documentation rating and the execution rating, by multiplying the documentation rating and the execution rating together.

11. The system of claim 9, wherein the documentation rating, execution rating, and criticality rating are each a number, and wherein the computer-executable compliance program assessment code comprises an upper limit and a lower limit for each of the documentation rating, execution rating, and criticality rating.

12. The system of claim 11, wherein the upper limit is the same for each of the documentation rating, execution rating, and criticality rating, and wherein the lower limit is the same for each of the documentation rating, execution rating, and criticality rating.

13. The system of claim 9, wherein the documentation rating, execution rating, and criticality rating are each a number between the range of one and five inclusive.

14. The system of claim 9, wherein the documentation rating and the execution rating are each a number, and wherein the computer-executable compliance program assessment code comprises an upper limit and lower limit of the documentation rating and the execution rating.

15. The system of claim 9, wherein the communication interface comprises a web server.

16. The system of claim 9, wherein the processor is configured to execute the computer-executable compliance program assessment code to use the communication interface to provide a graphical user interface to a user, wherein the graphical user interface prompts the user to enter the documentation rating and the execution rating.

17. The system of claim 9, wherein the processor is further configured to execute the computer-executable compliance program assessment code to:
determine a priority rating for each of the at least two compliance program requirements based at least partially on the compliance program assessment score of each of the at least two compliance program requirements.

18. The system of claim 9, wherein the processor is further configured to execute the computer-executable compliance program assessment code to:
assign a low-priority rating for a compliance program requirement if the compliance program requirement's compliance program assessment score is either:
(1) inside a predefined range, or
(2) outside the predefined range and the documentation rating or the execution rating is within a second predefined range.

19. The system of claim 9, wherein the processor is further configured to execute the computer-executable compliance program assessment code to provide graphical output to a user comparing the compliance program assessment scores of the at least two compliance program requirements.

20. The system of claim 9, wherein the processor is further configured to execute the computer-executable compliance program assessment code to provide graphical output to a user illustrating any compliance program requirements having a compliance program assessment score beyond a defined threshold score.

* * * * *